May 9, 1967            K. H. MACHER            3,318,653
OPTICAL OBJECTIVE OF 6 AIR-SPACED LENSES WITH
LARGE EFFECTIVE FIELD ANGLE
Filed July 18, 1963
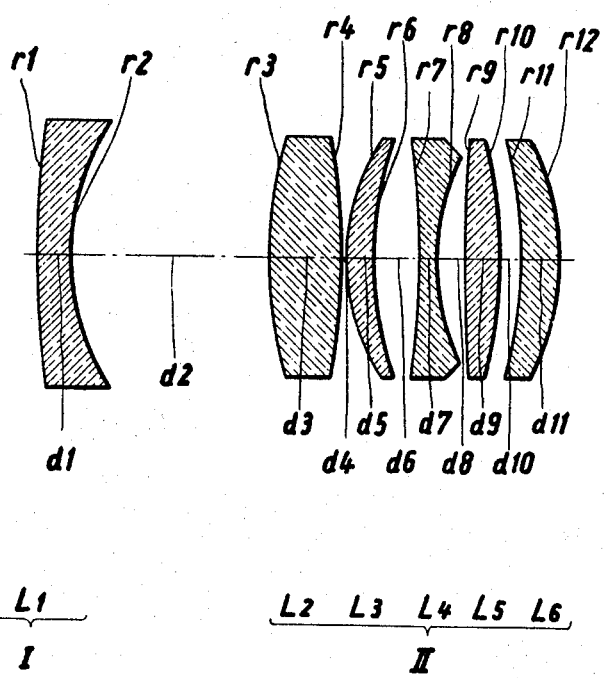
KARL H. MACHER
*Inventor:*
AGENT

United States Patent Office 3,318,653
Patented May 9, 1967

3,318,653
OPTICAL OBJECTIVE OF 6 AIR-SPACED LENSES WITH LARGE EFFECTIVE FIELD ANGLE
Karl H. Macher, Bad Kreuznach, Rhineland, Germany, assignor to Jos. Schneider & Co. Optische Werke, Bad Kreuznach, Rhineland, Germany, a corporation of Germany
Filed July 18, 1963, Ser. No. 296,036
Claims priority, application Germany, Sept. 12, 1962, Sch 32,015
1 Claim. (Cl. 350—215)

My present invention relates to a photographic or cinematographic optical objective having a substantial effective field angle and a back-focal length exceeding the overall focal length of the system.

It is an object of the instant invention to provide an objective system of the character set forth which, while being suitably corrected for spherical zonal aberration and field curvature, avoids the deficiencies of prior objectives of this general type wherein, for rays moderately slanted in the direction of the image diagonal, appreciable adjustment differences occur between the sagittal and the meridional image shells, along with significant residual comatic aberrations manifesting themselves as lack of contrast and diminished resolution at the corners.

The invention also aims at eliminating the annoying barrel-type distortion frequently encountered with prior systems.

A more particular object is to provide an objective which satisfies the aforestated requirements throughout a field subtending an angle greater than 60°, with a relative aperture of at least 1:2.8.

The foregoing objects are realized, in an objective system conforming to my invention, by the utilization of six air-spaced lenses—preferably singlets—of which the first constitutes a negative front lens, the other five being closely juxtaposed as a positive rear component separated from the front lens by an air space which ranges between substantially 0.3 and 0.4 times the overall focal length of the system. The positive component consists of a biconcave lens bracketed between two pairs of collective lenses, the more forwardly disposed member of each pair being a biconvex lens while the more rearwardly positioned one is a positive meniscus turning its less curved surface toward the biconcave lens. I have found that particularly good aberration correction is achieved if the ratio of the front and rear radii of curvature of the biconcave lens is equal to or greater than about half the corresponding ratio of the biconvex lens immediately following while, preferably, not exceeding twice the latter ratio.

Even more favorable results are obtained if, in accordance with another feature of this invention, the radius of the less strongly curved rear surface of the first positive meniscus, immediately preceding the biconcave lens, is at most equal in absolute length to about half the radius of the confronting forward surface of the biconcave lens, being preferably not less than about one-fourth thereof.

The sole figure of the accompanying drawing illustrates a representative embodiment of this invention.

The objective system shown in the figure consists of six air-spaced lenses including a dispersive front lens L1, constituting a negative front component I, and five other lenses L2 to L5 grouped together to form a positive rear component II. Lens L1 is in the shape of a meniscus with its forward face, of radius $r1$, less strongly curved than its rear face of radius $r2$; this lens has an axial thickness $d1$ and is separated from the biconvex first lens L2 (radii $r3$, $r4$ and thickness $d3$) by a large air space $d2$. The next lens L3, spaced from lens L2 by a small air gap $d4$, is a collective meniscus with an axial thickness $d5$, a forward surface of smaller radius $r5$ and a rear surface of larger radius $r6$ confronting, across a biconvex air space $d6$, the front face of the biconcave lens L4 having radii $r7$, $r8$ and thickness $d7$. Lens 5, separated from its predecessor by an air gap $d8$, is again biconvex (radii $r9$, $r10$, thickness $d9$). Following it, with spacing $d10$, is the meniscus-shaped positive lens L6 of thickness $d11$, turning its less strongly curved surface (radius $r11$) toward the front and its more strongly curved surface (radius $r12$) toward the rear, i.e., the side of the shorter light rays or image side of the system.

Representative numerical values of the radii $r1$ to $r12$ and the thicknesses and separations $d1$ to $d11$ of lenses L1 to L6, based upon an overall focal length of 100 linear units (e.g., millimeters), along with their refractive indices $n_d$ and Abbé numbers $\nu$ are listed in the following table, setting forth an objective of relative aperture 1:28 and back-focal length 103.11; its field angle—with full definition throughout—is about 63°.

TABLE

| | Lens | Radii | Thicknesses and Separations | $n_d$ | $\nu$ |
|---|---|---|---|---|---|
| I | L1 | $r1 = +199.30$ | $d1 = 6.00$ | 1.46450 | 65.79 |
| | | $r2 = + 47.20$ | $d2 = 37.68$ | Air space | |
| | L2 | $r3 = + 78.38$ | $d3 = 13.38$ | 1.70180 | 41.14 |
| | | $r4 = -183.65$ | $d4 = 0.96$ | Air space | |
| | L3 | $r5 = + 40.32$ | $d5 = 5.02$ | 1.61720 | 54.04 |
| | | $r6 = + 68.77$ | $d6 = 8.19$ | Air space | |
| II | L4 | $r7 = -175.00$ | $d7 = 3.25$ | 1.78470 | 26.10 |
| | | $r8 = + 44.17$ | $d8 = 5.46$ | Air space | |
| | L5 | $r9 = +398.04$ | $d9 = 6.28$ | 1.58900 | 48.64 |
| | | $r10 = - 98.80$ | $d10 = 4.15$ | Air space | |
| | L6 | $r11 = - 84.60$ | $d11 = 7.45$ | 1.72000 | 50.31 |
| | | $r12 = - 47.39$ | | | |
| | | | $d_{total} = 97.82$ | | |

It will be seen that the system illustrated in the drawing and defined in the table, besides having an air space $d2$ ranging between 0.3 and 0.4 times the overall focal length, provides a sharply dispersive air space $d6$, the biconvex shape with more pronounced forward curvature, by satisfying the conditions:

(a) $\left|\dfrac{r7}{r8}\right| = 3.96 \geqq 0.5 \left|\dfrac{r9}{r10}\right| = 2.01$ and (b) $|r6| = 68.77 \leqq 0.5|r7| = 87.5$ specified hereinbefore. The absolute length of radius $r10$ in the foregoing numerical example is greater than that of a radius $r11$ and the refractive index $n_d$ of lens L6 exceeds that of lens L5 whereby a meniscus-shaped dispersive air space $d10$ is formed between lenses L5 and L6.

I claim:

An optical objective system consisting of six air-spaced single lenses including a negative front lens and five additional lenses constituting a positive component separated from said front lens by an air space ranging between substantially 0.3 and 0.4 times the overall focal length of the system; said positive component consisting of a biconvex second lens, a meniscus-shaped positive third lens, a biconcave fourth lens, a biconvex fifth lens and a meniscus-shaped positive sixth lens, the numerical values of the radii $r1$ to $r12$ and of the thicknesses and separations $d1$ to $d11$ of said front lens L1 and said second, third, fourth, fifth and sixth lenses L2 to L6, based upon a numerical value of 100 for the overall focal length of the system, their refractive indices $n_d$ and their Abbé numbers $\nu$ being substantially as given in the following table.

TABLE

| | Lens | Radii | Thicknesses and Separations | $n_d$ | $\nu$ |
|---|---|---|---|---|---|
| I | L1 | $r1 = +199.30$ | $d1 = 6.00$ | 1.46450 | 65.79 |
| | | $r2 = + 47.20$ | | | |
| | | | $d2 = 37.68$ | Air space | |
| | L2 | $r3 = + 78.38$ | $d3 = 13.38$ | 1.70180 | 41.14 |
| | | $r4 = -183.65$ | | | |
| | | | $d4 = 0.96$ | Air space | |
| | L3 | $r5 = + 40.32$ | $d5 = 5.02$ | 1.61720 | 54.04 |
| | | $r6 = + 68.77$ | | | |
| | | | $d6 = 8.19$ | Air space | |
| II | L4 | $r7 = -175.00$ | $d7 = 3.25$ | 1.78470 | 26.10 |
| | | $r8 = + 44.17$ | | | |
| | | | $d8 = 5.46$ | Air space | |
| | L5 | $r9 = +398.04$ | $d9 = 6.28$ | 1.58900 | 48.64 |
| | | $r10 = - 98.80$ | | | |
| | | | $d10 = 4.15$ | Air space | |
| | L6 | $r11 = - 84.60$ | $d11 = 7.45$ | 1.72000 | 50.31 |
| | | $r12 = - 47.39$ | | | |
| | | | $d_{total} = 97.82$ | | |

References Cited by the Examiner

UNITED STATES PATENTS 2,298,853  10/1942  Warmisham _____ 88—57
2,649,022  8/1953   Angenieux _____ 88—57
3,030,860  4/1962   Hayes _____ 88—57

DAVID H. RUBIN, *Primary Examiner.*

JEWELL H. PEDERSEN, *Examiner.*

J. K. CORBIN, *Assistant Examiner.*